United States Patent
Mantovani

(10) Patent No.: US 7,281,446 B2
(45) Date of Patent: Oct. 16, 2007

(54) MACHINE TOOL WITH MACHINING HEAD KEPT FIXED BY MEANS OF BARS WHOSE LENGTH IS VARIABLE BY MAGNETOSTRICTION

(76) Inventor: Sascha Mantovani, Via Camara 46, 6932 Breganzona (CH)

(*) Notice: Subject to any disclaimer, the term of this patent is extended or adjusted under 35 U.S.C. 154(b) by 128 days.

(21) Appl. No.: 10/498,117

(22) PCT Filed: Dec. 10, 2001

(86) PCT No.: PCT/IB01/02383

§ 371 (c)(1),
(2), (4) Date: Oct. 13, 2004

(87) PCT Pub. No.: WO03/049897

PCT Pub. Date: Jun. 19, 2003

(65) Prior Publication Data

US 2005/0034551 A1    Feb. 17, 2005

(51) Int. Cl.
B25J 17/00 (2006.01)
B23Q 11/00 (2006.01)
G05B 19/19 (2006.01)

(52) U.S. Cl. .............. 74/490.01; 409/141; 318/568.11; 901/46

(58) Field of Classification Search .......... 74/490.01; 901/46, 49, 50; 414/719; 318/560, 568.11, 318/566, 635; 267/137; 408/143; 409/141
See application file for complete search history.

(56) References Cited

U.S. PATENT DOCUMENTS 3,429,155 A * 2/1969 Hines .................. 72/18.6
4,024,961 A * 5/1977 Stolpe .................. 414/729
4,378,959 A * 4/1983 Susnjara ................ 414/732
4,753,128 A * 6/1988 Bartlett et al. ............ 74/469
4,803,895 A * 2/1989 Nishizawa et al. .......... 74/603
6,145,403 A * 11/2000 Aschenbrenner et al. 74/490.01

FOREIGN PATENT DOCUMENTS

EP    198 59 360    7/2000
JP    01 281854    11/1989

* cited by examiner

Primary Examiner—Thomas R. Hannon
Assistant Examiner—Terence Boes
(74) Attorney, Agent, or Firm—Young & Thompson

(57) ABSTRACT

A machine tool (1) for machining by chip removal, in which a machining head (2) operates while being positioned in a horizontal plane and is mounted on a vertical bed (3) to which it discharges the forces (F) by which it is axially stressed, this vertical bed (3) being connected to a supporting structure (4). The vertical bed (3) is pivoted on the supporting structure (4) and there are interposed between the vertical bed and the supporting structure one or more bars (5) whose axial length (L) can be varied by magnetostriction produced by electric currents whose characteristics are determined continuously by a control device (6) in such a way as to counteract the horizontal movements of the vertical bed (3), thus keeping the machining head (2) fixed with respect to the workpiece (7) which it is machining.

6 Claims, 2 Drawing Sheets

MACHINE TOOL WITH MACHINING HEAD KEPT FIXED BY MEANS OF BARS WHOSE LENGTH IS VARIABLE BY MAGNETOSTRICTION

BACKGROUND OF THE INVENTION

The present invention relates to the field of machine tools, and more particularly to machine tools in which one or more machining heads operate horizontally, pressing axially on a workpiece to be machined by chip removal.

Because of the speed of operation of the modern machining heads used at present, and the speed of the movements imparted to them when they approach the workpiece, the said machining heads are subjected to considerable axial stresses, caused both by inertial phenomena and by forces which they exchange with the workpiece.

Consequently, the aforesaid machining heads tend to vibrate axially during operation, so that the position of the tool relative to the workpiece is modified from one instant to the next, according to the extent of the said axial stresses. This naturally gives rise to machining inaccuracies which are usually unacceptable.

These problems are aggravated by the fact that, in machines of the type described above, the machining heads are mounted horizontally on a vertical bed, fixed to supporting structures, which, as a result of the said stresses, is bent elastically, thus modifying the amplitude of the vibrations of a machining head in proportion to the square of the vertical distance between the machining head and the point at which the bed is fixed to the supporting structure.

There are two main types of arrangement used at the present time to compensate for the problems described above, or at least to limit their effects; the first of these arrangements consists in significantly increasing the mass of the bed and its characteristics of elastic yielding to bending, and the second consists in moderating both the operating speed and the speed of movement of the machining heads.

Clearly, both of these arrangements cause other problems, such as a considerable weight and cost, and a decrease in the output rate of the machine tool.

SUMMARY OF THE INVENTION

The inventor of the present invention has devised a machine tool of the type described above, which eliminates all the problems listed above in a dynamic rather than a static way, in that its machining head is constantly kept fixed with respect to the workpiece which it is machining by counteracting the instantaneous movements of the head due to axial stresses, as soon as they arise, with movements of equal extent but in the opposite direction, which are imparted to the machining head by a magnetostrictive bar whose length is varied from one instant to the next by controlling the currents which cause its magnetostriction.

The aforesaid "control" of the currents is achieved by sensors which detect even a minimal axial movement of the machining head and send a corresponding signal to a controller which instantaneously changes the characteristics of the said current in such a way as to vary the length of the aforesaid magnetostrictive bar which, being connected mechanically in a suitable way to the machining head, immediately returns the latter to its correct position.

The amplitude of the vibrations induced by axial stresses in the machining head is thus greatly reduced, since it depends only on the sensitivity of the sensor and on the response time of the magnetostrictive system, which are factors which can be easily kept within a desired operating range by means of electronic circuits and equipment of known types.

When the machining head is kept essentially fixed in the dynamic way described above, it is no longer necessary for the aforesaid vertical bed to have a very high inertia and high rigidity, and this bed plays a marginal role, or at least one of secondary importance, in the correct positioning of a machining head fixed on it.

This is because the bed, in the machine tool according to the invention, is not fixed, but is hinged on the supporting structure, and can rotate with respect to the latter as a result of the variation of length of the said magnetostrictive bar, whose ends are pivoted on the vertical bed and on the supporting structure.

A more detailed description of a preferred example of embodiment of the machine tool according to the invention will now be given, this example being chosen from the numerous embodiments which can be produced by a person skilled in the art who applies the teachings herein.

BRIEF DESCRIPTION OF THE DRAWINGS

In the said description, reference will also be made to the attached drawings, which show in FIG. 1, a partial schematic side view of the said example of embodiment of a machine tool according to the invention.

DESCRIPTION OF THE PREFERRED EMBODIMENTS

Figure 1:
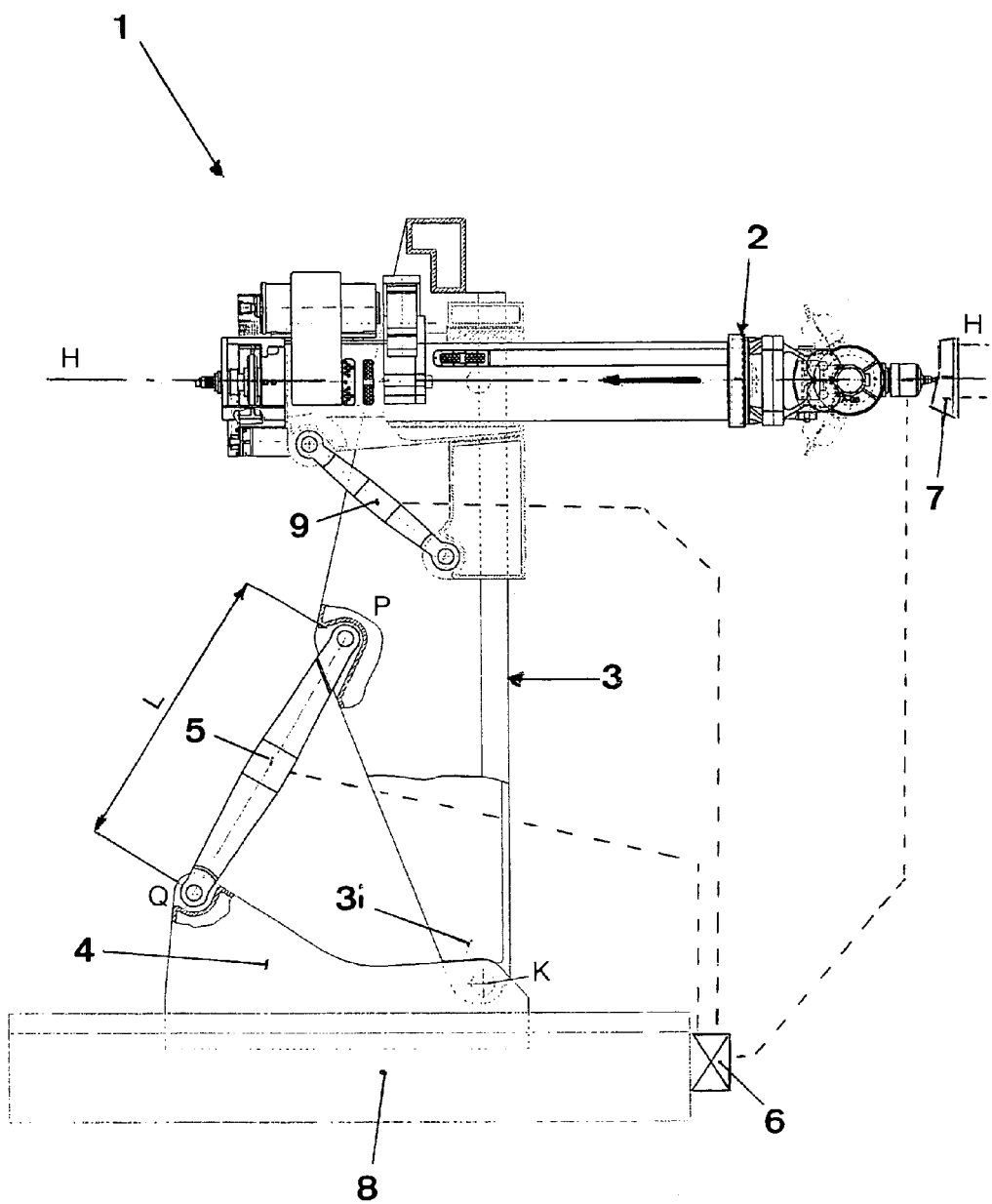
Figure 2:
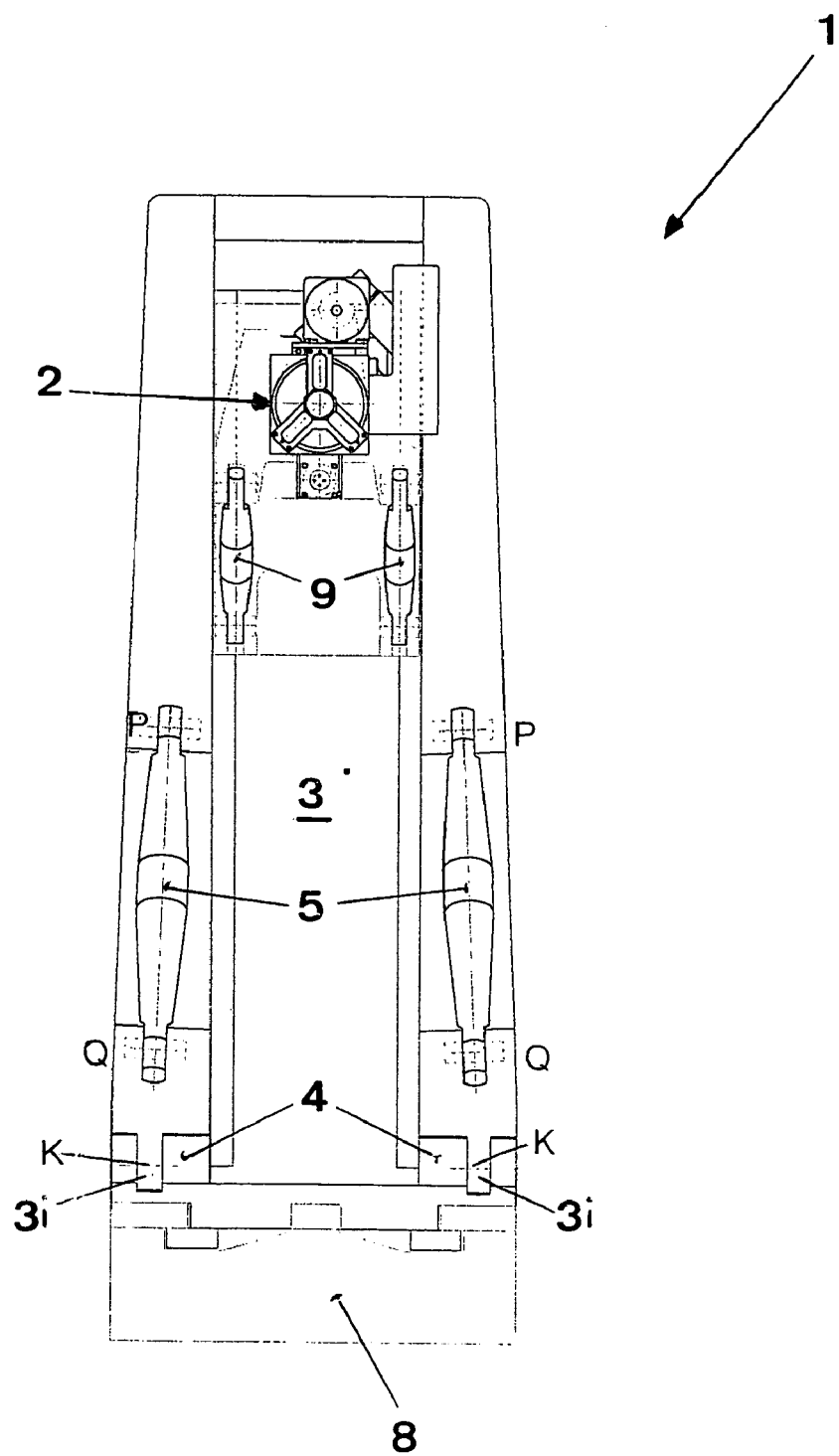
in FIG. 2, a partial schematic rear view of the machine of FIG. 1.

The attached FIGS. 1 and 2 show how, in a machine tool 1 according to the invention, a machining head 2, positioned horizontally, is mounted on a vertical bed 3, along which it can slide vertically to machine surfaces of workpieces 7 positioned at various heights.

The machining head discharges to the said vertical bed 3 the forces F which act on it axially during machining, and the said vertical bed 3 is pivoted at its lower end 3i on a supporting structure 4, which in the case in question is positioned horizontally, and can slide horizontally, by known methods, on a supporting platform 8 which also acts as the machine base.

The forces F tend to make the vertical bed 3 rotate about its pivot point K, but this is countered by the reaction provided by one or more magnetostrictive bars 5 (two in the present case) of a known type, which are pivoted at their ends P and Q on the vertical bed 3 and on the supporting platform 4 respectively.

Because of the considerable intensity which the said forces F can reach, the vertical bed 3 also tends to bend elastically, oscillating as a result of the stresses transmitted to it by the machining head 2, but the aforesaid magnetostrictive bars 5 react under the command of a control device 6, which acts instantaneously and continuously to modify their length L, thus counteracting, from one instant to the next, the movements of the vertical bed 3 in such a way as to keep the position of the machining head 2 essentially fixed with respect to the workpiece 7.

Naturally, the aforesaid control of the length L of the magnetostrictive bars 5 is provided by the aforementioned control device 6 by continuous modification of the characteristics of the electric currents which determine the intensity of the magnetostrictive effect.

The said control device 6 can be guided by means of sensors (not shown) which sense the instantaneous relative movements of the machining head 2, thus transmitting to the device the pulses which it uses to modify the said characteristics of the magnetostriction currents in such a way as to achieve the desired effect, which as stated above consists in keeping the relative position of the machining head 2 essentially fixed with respect to the workpiece 7.

Clearly, depending on the type of machining head and the intensity of the axial stresses acting on it, it is possible to use a number of magnetostrictive bars 5 other than two, the bars possibly being positioned and/or fixed in a different way from that described for the case under examination.

In any case, a machine tool constructed according to the invention achieves the object desired by the inventor, in other words that of keeping the relative positions of the machining head and the workpiece fixed, while using lighter structures and thus achieving a higher machining speed with unusually accurate results.

As shown in the figures, the inventor also provides for the possibility of interposing between the machining head 2 and the corresponding vertical bed 3 an additional bar or bars 9 (two in the present case) whose length can be varied in a way which is completely identical to that described for the bars 7 interposed between the bed 3 and the said supporting structure 4, and which have the function of keeping the position of the horizontal longitudinal axis H-H of the machining head 2 fixed, by preventing it from rotating in the vertical plane on which it lies, in such a way as to counteract and cancel out the effects of vertical components of the forces exchanged between the machining head 2 and the workpiece 7.

The invention claimed is:

1. Machine tool (1) for machining by chip removal, comprising:
    a machining head (2) that operates while being positioned in a horizontal plane and is mounted on a vertical bed (3) to which said machining head discharges forces (F) by which said machining head is axially vibrated, said vertical bed (3) being pivotally connected to a supporting structure (4);
    a control device that continuously provides an electric current that is responsive to axial vibration of said machining head; and
    one or more bars (5) interposed between the vertical bed and the supporting structure, said one or more bars having an axial length (L) that is varied by magnetostriction produced by the electric current and that counteracts the axial vibration, thus keeping said machining head (2) fixed with respect to a workpiece (7) which it is machining.

2. Machine tool according to claim 1, comprising two of said bars (5), wherein each of said bars is free to rotate about ends that are pivoted on said supporting structure (4) and on said vertical bed (3) respectively.

3. Machine tool according to claim 2, further comprising one or more additional bars (9) interposed between said machining head (2) and said vertical bed (3) and whose axial length is varied by magnetostriction, said additional bars being positioned and connected in such a way as to keep a horizontal longitudinal axis (H-H) of the machining head (2) fixed by preventing it from rotating in a vertical plane on which it lies.

4. Machine tool according to claim 1, further comprising one or more additional bars (9) interposed between said machining head (2) and said vertical bed (3) and whose axial length is varied by magnetostriction, said additional bars being positioned and connected in such a way as to keep a horizontal longitudinal axis (H-H) of the machining head (2) fixed by preventing it from rotating in a vertical plane on which it lies.

5. Machine tool according to claim 4, in which said additional bars (9) have ends that are pivotally attached to said machining head (2) and the vertical bed (3).

6. A machine tool for machining by chip removal, comprising:
    a machining head having a horizontally extended axis and being mounted on a vertical member, said vertical member being pivotally connected to a support, said machining head having an axial vibration that varies a distance between said machining head and a workpiece;
    a controller that continuously provides an electric current that is responsive to the axial vibration of said machining head; and
    a bar connected to said vertical member and to said support to vary an angle between said vertical member and said support, said bar being connected to said controller to receive said electric current, said bar having a length that is varied by magnetostriction produced by said electric current in directions opposite the axial vibration to counteract the axial vibration and reduce variation of the distance between said machining head and the workpiece.

* * * * *